United States Patent
Gestermann et al.

(10) Patent No.: US 6,916,901 B2
(45) Date of Patent: Jul. 12, 2005

(54) PRODUCTION OF POLYAMIDE

(75) Inventors: Sven Gestermann, Köln (DE); Ralph Ulrich, Ratingen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 189 days.

(21) Appl. No.: 10/289,637

(22) Filed: Nov. 7, 2002

(65) Prior Publication Data

US 2003/0125506 A1 Jul. 3, 2003

(30) Foreign Application Priority Data

Nov. 9, 2001 (DE) .......................................... 101 55 242

(51) Int. Cl.⁷ ............................................... C08G 69/08
(52) U.S. Cl. ...................... 528/310; 528/312; 528/322; 528/323; 528/332; 528/335; 528/336; 528/480; 528/483; 528/503
(58) Field of Search ................................ 528/310, 312, 528/322, 323, 332, 335–336, 480, 483, 503

(56) References Cited

U.S. PATENT DOCUMENTS

| 4,204,049 | A | * | 5/1980 | Matthies et al. | ............... 526/65 |
| 4,327,208 | A | * | 4/1982 | Lehr et al. | .................... 528/323 |
| 4,540,774 | A |   | 9/1985 | Gerking et al. | ............. 526/502 |
| 4,540,779 | A |   | 9/1985 | Conrad et al. | ................. 544/24 |
| 4,734,263 | A |   | 3/1988 | Gerking et al. | ............. 422/135 |
| 5,543,495 | A |   | 8/1996 | Anolick et al. | ............. 528/481 |
| 5,659,009 | A | * | 8/1997 | Pipper et al. | ................ 528/335 |
| 5,696,227 | A | * | 12/1997 | Mumcu | ...................... 528/318 |
| 6,258,926 | B1 |   | 7/2001 | Wiltzer et al. | ............... 526/310 |
| 6,566,487 | B2 | * | 5/2003 | Buijs et al. | .................. 528/310 |
| 6,710,159 | B2 | * | 3/2004 | Morhenn et al. | ........... 528/310 |

FOREIGN PATENT DOCUMENTS

| DE | 227 140 | 9/1985 |
| DE | 234 430 | 4/1986 |
| DE | 43 02 764 | 8/1994 |

* cited by examiner

*Primary Examiner*—P. Hampton Hightower
(74) *Attorney, Agent, or Firm*—Jill Denesvich

(57) ABSTRACT

The present invention provides a method for the production of polyamide 6 by the hydrolytic polymerization of ε-caprolactam, in which, in the first step, caprolactam ring opening occurs under the action of water and, in the following steps, polycondensation is performed at low temperatures under anhydrous conditions.

11 Claims, No Drawings

PRODUCTION OF POLYAMIDE

FIELD OF THE INVENTION

The present invention relates to a method for the production of polyamide 6 by the hydrolytic polymerization of ε-caprolactam, in which, in the first step, caprolactam ring opening occurs under the action of water and, in the following steps, polycondensation is performed at low temperatures under anhydrous conditions.

BACKGROUND OF THE INVENTION

Methods for the production of polyamide (PA) are well known (e.g., Kohan, Nylon Plastics Handbook, Carl Hanser Verlag, Munich, 1995 and Kunststoff Handbuch, 3. Technische Thermoplaste, 4. Polyamide, Carl Hanser Verlag, Munich, 1998 (pages 42–47 and 65–71)). According to such methods, in the first step, caprolactam is at least partially cleaved under the action of water to yield the corresponding aminocaproic acid, and in the subsequent step, further polymerized by polyaddition and polycondensation with the removal of water.

On an industrial scale, polyamide is produced in a VK tube (VK=simplified, continuous), in which liquid caprolactam is introduced, with approx. 1–4% of water, from the top into a single, vertical, tubular reactor or a series thereof. Excess water is removed by distillation.

Polymerization is performed at temperatures of between 240° C. and 270° C. in 15 to 30 hours. The process may be accelerated by a few hours by providing an upstream pressure stage, in which the rate-determining cleavage of caprolactam is performed under elevated pressure but otherwise similar conditions.

In this process, the water content of the melt determines the achievable viscosity. As a general rule, relative viscosities of around 2.6–3.0 (measured as a 1% solution in m-cresol at 25° C.) may be achieved.

For thermodynamic reasons, conversion in this process is limited. For example, at equilibrium at 270° C., in addition to polyamide, there is still a residual content of approx. 10% of low molecular weight species, substantially caprolactam and cyclic oligomers (dimer-tetramer). This residual content drops significantly as temperatures fall. Because the residual content is disruptive to subsequent applications, it is necessary to minimize the residual content. This may be achieved by aqueous extraction or by vacuum delactamization.

Viscosities higher than those stated above, and which are required for certain applications (for example extrusion), are conventionally achieved in a subsequent solid phase postcondensation at temperatures of 30–80° C. below the polymer melting point under a vacuum or a countercurrent stream of inert gas. For example, starting from polyamide 6 with a relative viscosity of 2.8, a relative viscosity of 3.8 is achieved in 24 hours at 185° C.

Alternatives to these tried and tested approaches have recently been described that permit distinctly faster polymerization, in particular faster melt postcondensation of (pressure stage) prepolymers, and which also make it possible to obtain higher viscosities directly in the melt.

WO-A 00/23501 and WO-A 00/23502 describe melt postcondensation of prepolymers in horizontal, tubular reactors with spreading over the surface, resulting in the production of large, self-renewing melt surfaces. A stream of inert gas is passed through the reactor to bring about more efficient dewatering of the melt by reducing the partial pressure of water in the gas phase. In this manner, relative viscosities of up to 4.0 have been achieved in residence times of 4.5 hours. The process described in the Examples therein was performed at 267° C. In addition, demonomerization was achieved in this process. In a preferred embodiment, in a first process stage caprolactam ring opening was also performed under the action of water in the gas phase (elevated $H_2O$ partial pressures) in a reactor with large, self-renewing surfaces.

EP-A 137 884 and U.S. Pat. No. 4,540,774 describe a related process for integrated demonomerization and postcondensation, wherein a more effective demonomerization may be achieved by operating the horizontal, tubular reactor under a vacuum (p<5 torr). In the Examples therein, the process was operated at 284° C.

DD-A 227 140 describes a multistage process for melt postcondensation of pressure stage prepolymer using a sequence including a melt drying stage and a subsequent polycondensation stage. Owing to the use of falling polymer threads of small diameter and a countercurrent stream of nitrogen, the polymer dries rapidly such that the water content in the melt is taken far from equilibrium. This brings about an elevated rate of polycondensation in the subsequent condensation stage. Additional water is liberated by the condensation, which is removed in a further melt drying stage, such that a rapid build-up of viscosity can be achieved in the next polycondensation reactor. In addition to using falling polymer threads to achieve large surface areas, a film evaporator is also described in which the melt flows as a thin film over a vertical metal gauze, also under a countercurrent stream of inert gas. In the Example therein, the described process is performed at 275° C.

A similar processing scheme is described in DE-A 19 506 407, in which large, self-renewing melt surfaces and dewatering are achieved under a countercurrent stream of inert gas on expanded metals, followed by a melt sump, which functions as do the above-described polycondensation reactors. These reactors are connected in series as a cascade. In this process, an attempt is made to ensure sump residence times of <0.5 h, while in the Example therein, the melt temperature is 280° C. Where three such reactors are used, a relative viscosity of 3.8 is achieved in an overall melt postcondensation time of 2 hours.

DD-A 234 430 describes a similar process, but without stating details of precise process parameters, using various degassing reactors, which degas thin films of melt with the assistance of vertical expanded metal/perforated sheets.

DE-A 69 512 437 describes a process in which a more rapid build-up in PA viscosity is achieved by mixing a stripping agent ($N_2$) into the polymer melt under pressure and subsequently depressurizing the mixture to strip $H_2O$ out under a vacuum. The foaming seen on depressurization also results in large surface areas, and thus, effective dewatering of the melt. The melt is kept at the same, unstated temperature until equilibrium is established. The preferred embodiment of this process is to use an extruder.

As can be appreciated by those skilled in the art, the above-detailed processes have the following elements in common:

1. Effective dewatering of polyamide melts brings about very high rates of polycondensation due to the great distance from equilibrium.
2. The effective dewatering is achieved by increasing the surface area of the melt, thereby ensuring short diffusion paths for water and by reducing the partial pressure of water in the gas phase to further increase the efficiency of melt drying.

3. The temperatures described in the relevant Examples are above 265° C.

However, it is well-known by those skilled in the art that the above-stated conditions are precisely those under which secondary reactions occur which may bring about decarboxylation and branching. DE-A 22 55 674 accordingly describes, precisely in polyamide melts having a water content far below equilibrium, distinct decarboxylation and branch formation.

One attempt to overcome the disadvantages of the secondary reactions, which is described in DE-A 22 55 674, is to use an inert gas with an elevated water vapor partial pressure. However, the disclosed procedure has the disadvantage that the achievable viscosities are distinctly lower than where the process is performed without water vapor.

SUMMARY OF THE INVENTION

Accordingly, the present invention provides an improved process for the production of polyamide 6 or copolyamide based on polyamide 6 in at least two stages, in which a polyamide, preferably prepolyamide from the first stage(s) is melt postcondensed, the improvement comprising:

melt postcondensing with an increased melt surface area with a surface area/volume ratio of >20 m$^{-1}$, using a stream of inert gas and/or with a reduction in overall pressure, and performing melt postcondensation at a temperature between melting point and melting point +40° C.

These and other advantages and benefits of the present invention will be apparent from the Detailed Description of the Invention herein below.

DETAILED DESCRIPTION OF THE INVENTION

The present invention, therefore, provides a process for effective melt postcondensation combining the above-stated principles of a large melt surface area, short diffusion paths and reduced water vapor partial pressure in the gas phase. The process of the present invention yields a polyamide with a sufficiently high viscosity and, largely avoids secondary products arising from decarboxylation and the formation of chain branches.

It has surprisingly been found that reducing the postcondensation temperature to T<260° C. results in melt postcondensation without secondary reactions, in particular without end group degradation. Moreover, the increase in viscosity in the process of the present invention is always far faster than in the conventional VK tube process.

The process of the present invention, therefore, makes it possible to produce medium to high viscosity polyamide from polyamide, preferably prepolymers, by melt postcondensation at moderate temperatures, namely T<260° C., preferably T<255° C., in very short periods (for example $\eta_{rel}$=2.9 (injection molding viscosity) in <2.5 h; $\eta_{rel}$=3.8 (film viscosity) in ~5.5 h, starting from a prepolymer with $\eta_{rel}$=1.9). In addition to the reduction in residence time, the advantages are principally, a) the avoidance of secondary reactions, in particular decarboxylation, and b) in comparison with the conventional process, a greatly reduced content of caprolactam and cyclic dimers, which may simplify any subsequent extraction steps.

The present invention provides a process for the production of polyamide 6 or copolyamides of polyamide 6 in at least two stages, in which a polymer, preferably polyamide, very preferably prepolyamide from the first stage(s) is melt postcondensed in such a manner that melt postcondensation is performed a) with an increased melt surface area with surface area/volume ratios of >20 m$^{-1}$, preferably of >100 m$^{-1}$, particularly preferably of >200 m$^{-1}$, preferably also with constant renewal of the melt surface and thus short diffusion paths (<5 cm, preferably <1 cm, particularly preferably <0.5 cm) for the water from the melt into the gas phase;

b) with significant reduction of water partial pressure in the gas phase by using a stream of inert gas passed over the melt, by incorporating a stripping agent (inert gas) into the melt with subsequent foaming of the melt and/or by reducing overall pressure, preferably vacuum;

and in a temperature range of melting point<temperature<melting point +40° C., preferably in a temperature range melting point<temperature<melting point +35° C.

For example, for polyamide 6 the values are 220° C. <temperature<260° C. and preferably in the range between 220° C. and 225° C.

In the process of the present invention, starting from polyamide, preferably prepolyamide, preferably with $\eta_{rel}$<2.2, it is possible very rapidly to obtain not only moderate viscosities, as are required for injection molding ($\eta_{rel}$=2.6–3.0 in<2–3 h), but also high viscosities, for example for extrusion applications ($\eta_{rel}$=3.5–6.0). Using the process of the present invention, the latter-stated high viscosity polyamides may, of course, also be obtained starting from a higher viscosity polyamide (for example injection molding viscosity ($\eta_{rel}$=2.6–3.0)). The polyamide obtained in this manner is characterized by a balanced end group balance as, due to the low temperature, the polymer does not suffer any thermal damage. An additional advantage of the processing method of the present invention is the reduced lactam and oligomer content relative to the conventional process as, for thermodynamic reasons, the equilibrium contents of lactam and cyclic dimer are lower at a lower temperature.

In the process of the present invention, one or more reaction stages may be used for the melt postcondensation of polyamides, wherein at least one stage is operated in accordance with the stated principles.

In an embodiment of the present invention, conventional pressure stage prepolymers ($\eta_{rel}$<2.2) are used. It is, however, also possible to use prepolymers which are produced by other methods via hydrolytic ring opening. It is also possible to melt postcondense higher viscosity polyamides (for example injection molding viscosities $\eta_{rel}$~2.6–3.0) in this manner to yield higher viscosities in the melt (for example viscosities for film extrusion $\eta_{rel}$~3.6–4.2).

Melt postcondensation may itself be performed in one or more stages. Identical or different stages may be connected in series.

In another embodiment, an alternating sequence of reaction zones with effective melt degassing and sump zones may be used to re-establish melt equilibrium. A process with constant melt dewatering under the stated conditions is, however, also possible.

Melt postcondensation may be performed using any type of reactor which permits effective melt dewatering in accordance with the above-stated principles. The following degassing apparatus are preferred for use in the process of the present invention: flash evaporators, film evaporators, degassing extruders, degassing centrifuges, falling-film evaporators and other degassing reactors in which it is possible to produce large melt surface areas (melt film or foam) and to expose the melt to a stream of inert gas (preferably $N_2$) or a vacuum in order to reduce the water vapor partial pressure in the gas phase.

In another embodiment of the present invention, in particular for injection molding viscosities ($\eta_{rel}$=2.6–3.0), one or more of the melt postcondensation stages, conveniently the final stage(s), is(are) additionally operated for demonomerization/dedimerization, in this embodiment preferably under a vacuum, optionally with introduction of a stripping agent (inert gas).

If a static or dynamic mixer or an extruder is connected downstream from the final stage, the polyamide, still in melt form, may be directly processed by the addition of fillers/additives to yield special compounds (for example fiber-reinforced polyamide) or the polyamide may be colored. Chemical modification of the polyamide by apportioning reactive components is also possible in this manner.

In another embodiment of the process of the present invention, in particular when the final postcondensation stage(s) is(are) used for simultaneous demonomerisation, the melt leaving the final postcondensation stage is accordingly directly subsequently compounded or provided with fillers or additives.

In an alternative embodiment, aqueous extraction of monomer and oligomers may be performed after the process.

The present invention also provides a process in which the melt leaving the postcondensation is directly provided with fillers and/or additives or is chemically modified by means of suitable mixing means, preferably twin-screw extrusion, static or dynamic mixers.

Using the process of the present invention, it is possible to produce any grades of polyamide 6 and copolyamides of polyamide 6 known in principle with a relative solution viscosity of $\eta_{rel}$=2.4 to 4.5, preferably of $\eta_{rel}$=2.5 to 3.5, particularly preferably of $\eta_{rel}$=2.6 to 3.2.

Using the process of the present invention, it is also possible to produce polyamides from the monomer classes: lactams or aminocarboxylic acids or diamines together with dicarboxylic acids or mixtures thereof.

Preferred polyamides are those based on: ε-Caprolactam and mixtures of ε-caprolactam and aminoundecanoic acid and the diamines 1,6-hexamethylenediamine, isophoronediamine and the dicarboxylic acids adipic acid, isophthalic acid and mixtures thereof with a proportion of ε-caprolactam in the finished polymer of >75 wt. %. Particularly preferred polyamides are those based on: ε-Caprolactam and 1,6-aminocaproic acid. Optionally usable copolyamides are those based on: Mixtures of ε-caprolactam and other lactams having 7 to 15 carbon atoms and α, ω-diamines having 4 to 20 carbon atoms which are derived from alkylene or arylene and the α,ω-dicarboxylic acids having 4 to 20 carbon atoms which are derived from alkylene or arylene and mixtures thereof with a proportion of ε-caprolactam in the finished polymer of >50 wt. %.

For the purposes of the present invention, relative solution viscosity is measured as the relative viscosity (ratio of flow times in a Ubbelohde viscosimeter) of a cresol solution prepared from a polyamide (PA) sample of 1 g which has been made up to 100 ml of solution.

Preferred applications for the polyamides obtainable from the process are:

1. Direct use as a molding composition for the production of moldings
2. Molding composition for the production of compounds in a separate processing step by addition of fillers and additives in a melt compounding operation by means of twin-screw extrusion, which compounds are only then used as a molding composition for the production of moldings.

The invention also provides molding compositions for the production of moldings, hollow articles, (un)reinforced semi-finished products, films or fibers and monofilaments containing a polyamide composition according to the invention. The present invention also provides moldings, fibers or monofilaments producible from the molding compositions according to the invention.

The present invention will now be described for purposes of illustration and not limitation by the following examples.

EXAMPLES 25 g of a prepolymer (pressure stage sample from polyamide test plant/autoclave) was heated for a defined period with the internal temperature measured in a 250 ml round-bottomed flask with intermittent rotation (<30 rpm) with periodic 10 second standstills, 2/min. As a result, a thin film of melt (0.1 cm–1 cm) was formed, the surface of which was constantly renewed. A stream of nitrogen (50 l/h; τ point: −60° C.) heated to the oil bath temperature was passed over the surface of the melt and discharged through a riser tube. Upon completion of the reaction, the melt was quenched (dry ice), ground and analyzed. The measured melt temperature varied by ~±5° C., which was substantially attributable to the measurement setup.

Several polyamides were prepared and the processing conditions are summarized in Table I.

TABLE I

| | Melt temperature | $N_2$ stream | Rotation |
|---|---|---|---|
| Prepolymer from pressure stage: 2 h, 2% water, 275° C. | | | |
| Example 1 | 265–275° C. | 50 l/h, constant | Constant with periodic short standstills |
| Example 2 | 245–255° C. | 50 l/h, constant | Constant with periodic short standstills |
| Prepolymer from autoclave: 4% water, 4 h, 235° C. | | | |
| Example 3 | 265–275° C. | 50 l/h, constant | Constant with periodic short standstills |
| Example 4 | 245–255° C. | 50 l/h, constant | Constant with periodic short standstills |
| Polymer from polyamide test plant (2 stage, pressure stage (275° C., 2 h residence time, 2% $H_2O$), melt postcondensation analogous to conventional VK tube) | | | |
| Comparative Example 5 | $T_{PC,\,top}$: 275° C. $T_{PC,\,bottom}$: 250° C. | Postcondensation (PC) residence time: 8.0 h | |

The polyamides prepared in the above examples were melt postcondensed at various lengths of time, then analyzed. The results are summarized below in Table II.

TABLE II

| | | | End group concentration | | |
|---|---|---|---|---|---|
| Example/ Test no. | Reaction time [h] | $\eta_{rel}$ (cresol) | c ($-NH_2$) [meq/ 100 g] | c ($-COOH$) [meq/100 g] | $\Delta_{end\,groups}$ [meq/100 g] |
| Example 1 | 0.0 | 1.87 | 13.63 | 13.67 | −0.04 |
| | 1.0 | 2.99 | 4.82 | 4.66 | 0.16 |
| | 2.0 | 3.75 | 3.53 | 2.39 | 1.14 |
| | 3.0 | 4.28 | 2.86 | 2.26 | 0.6 |
| | 4.0 | 4.92 | 3.06 | 1.69 | 1.37 |
| | 6.0 | 4.49 | 5.15 | 0.73 | 4.42 |
| | 8.0 | 4.55 | 6.76 | 0.58 | 6.18 |
| Example 2 | 0.0 | 1.87 | 13.63 | 13.67 | −0.04 |
| | 1.0 | 2.55 | 6.8 | 6.48 | 0.32 |
| | 2.0 | 2.87 | 5.1 | 5.35 | −0.25 |
| | 3.0 | 3.08 | 5.13 | 5.04 | 0.09 |
| | 4.0 | 3.37 | 4.06 | 3.4 | 0.66 |

TABLE II-continued

| | | | End group concentration | | |
|---|---|---|---|---|---|
| Example/ Test no. | Reaction time [h] | $\eta_{rel}$ (cresol) | c (—NH$_2$) [meq/ 100 g] | c (—COOH) [meq/100 g] | $\Delta_{end\ groups}$ [meq/100 g] |
| | 6.0 | 4.06 | 3.0 | 3.07 | −0.07 |
| | 8.0 | 4.65 | 2.75 | 2.34 | 0.41 |
| Example 3 | 0.0 | 1.96 | 12.69 | 12.82 | −0.13 |
| | 1.0 | 3.33 | 3.94 | 4.3 | −0.36 |
| | 2.0 | 4.13 | 3.16 | 3.11 | 0.05 |
| | 3.0 | 4.51 | 2.85 | 2.25 | 0.60 |
| | 4.0 | 4.98 | 2.79 | 1.85 | 0.94 |
| | 6.0 | 5.22 | 2.98 | 1.41 | 1.57 |
| | 8.0 | 5.6 | 3.48 | 0.91 | 2.57 |
| Example 4 | 0.0 | 1.96 | 12.69 | 12.82 | −0.13 |
| | 1.0 | 2.67 | 6.04 | 6.44 | −0.4 |
| | 2.0 | 3.02 | 5.04 | 5.45 | −0.41 |
| | 3.0 | 3.19 | 4.42 | 4.82 | −0.41 |
| | 4.0 | 3.34 | 4.07 | 4.19 | −0.12 |
| | 6.0 | 3.93 | 3.18 | 3.58 | −0.4 |
| | 8.0 | 3.99 | 2.82 | 3.17 | −0.35 |
| Comp. Ex. 5 | 0.0 | 1.87 | 13.63 | 13.67 | −0.04 |
| | 8.0 | 3.29 | 4.76 | 4.34 | 0.42 |

The Examples clearly demonstrate that very rapid increases in viscosity and elevated final viscosities may be achieved if prepolymers are melt postcondensed with greatly enlarged, self-renewing surfaces and with reduction of H$_2$O partial pressure with a stream of inert gas. It is clear from the Examples that at temperatures of >265° C. (Examples 1 and 3), distinct damage was caused to the polymer, as is shown by the increasing disruption of the end group balance. The end group difference after ~4 h accordingly reached a value $\Delta_{end\ groups}$>1 meq/100 g. At longer residence times, the extent of thermal damage to the polymer was so great that viscosity in some cases (Example 1) even declined again.

At 245–255° C. (Examples 2 and 4), in comparison with the standard process (Comparative Example 5), distinctly faster postcondensation was still achieved (at 245–255° C., for example, an injection molding viscosity of $\eta_{rel}$~3.0 was achieved 2–3 times faster than in the conventional process). In this case too, very high viscosities were achievable, but even after a postcondensation time of 8 h, the end group ratio was approximately balanced, the polymer not having suffered thermal damage. The end group difference $\Delta$ for Examples 2 and 4 was distinctly lower than in the high temperature tests, with the maximum values measured also being below the end group differences in the comparative tests, which correspond to the conventional process (Comparative Example 5; $\Delta$=0.42–0.43 meq/100 g).

The negative end group differences (excess of carboxyl end groups) which occur may be attributed to oxidative damage of the polyamide, which is caused by inadequate inertization with regard to atmospheric oxygen, which is believed to be inevitable on the laboratory scale.

Although the present invention has been described in detail in the foregoing for the purpose of illustration, it is to be understood that such detail is solely for that purpose. It will be apparent to those skilled in the art that variations can be made therein without departing from the spirit and scope of the invention. The scope of the invention is to be measured by the appended claims.

What is claimed is:

1. In a process for the production of polyamide 6 or copolyamide based on polyamide 6 in at least two stages, in which a polyamide from the first stage(s) is melt postcondensed, the improvement comprising:

melt postcondensing with an increased melt surface area with a surface area/volume ratio of >20 m$^{-1}$, using a stream of inert gas and/or with a reduction in overall pressure, and performing melt postcondensation at a temperature between melting point and melting point +40° C.

2. The process according to claim 1, wherein the postcondensation proceeds at a temperature which is between melting point and melting point +35° C.

3. The process according to one of the preceding claims, wherein delactamisation proceeds simultaneously during the postcondensation.

4. The process according to one of claim 1 or 2, wherein the melt leaving the postcondensation is directly provided with fillers and/or additives or is chemically modified by means of mixing means.

5. The process according to claim 4, wherein the mixing means is selected from twin-screw extrusion, static or dynamic mixers.

6. The process according to one of claim 1 or 2, wherein the polyamide from the first stage(s) is produced at a temperature of <240° C.

7. The polyamide produced according to one of claims 1 or 2.

8. The molding composition comprising the polyamide produced according to one of claim 1 or 2.

9. A method of making a molding composition comprising mixing the polyamide according to claim 7 with fillers and/or additives or chemically modifying the polyamide by means of mixing means.

10. The molding produced with a polyamide 6 made according to one of claim 1 or 2.

11. The process according to claim 1, wherein the polyamide is a prepolyamide.

* * * * *